United States Patent [19]

Lardellier

[11] 4,295,787
[45] Oct. 20, 1981

[54] REMOVABLE SUPPORT FOR THE SEALING LINING OF THE CASING OF JET ENGINE BLOWERS

[75] Inventor: Alain M. J. Lardellier, Melun, France

[73] Assignee: Societe Nationale d'Etude et de Construction de Moteurs d'Aviation, Paris, France

[21] Appl. No.: 132,642

[22] Filed: Mar. 21, 1980

[30] Foreign Application Priority Data

Mar. 30, 1979 [FR] France .................................. 79 08583

[51] Int. Cl.³ ........................ F04D 29/54; F01D 11/08
[52] U.S. Cl. ..................................... 415/197; 415/174
[58] Field of Search ........................ 415/196, 197, 174

[56] References Cited

U.S. PATENT DOCUMENTS 3,243,158  3/1966  Desmond ..................... 415/197 X
3,314,648  4/1967  Howald ............................. 415/174

Primary Examiner—Leonard E. Smith
Attorney, Agent, or Firm—Bacon & Thomas

[57] ABSTRACT

A support for a sealing lining of a jet engine blower consists of three concentric ferrules: one inner ferrule carrying the sealing lining, an intermediate ferrule, an outer ferrule, and a U-shaped ferrule supporting the inner and outer ferrules. The ferrules are made of epoxy resin and glass fibers. The outer ferrule has surfaces which telescope into parts of the casing.

7 Claims, 1 Drawing Figure

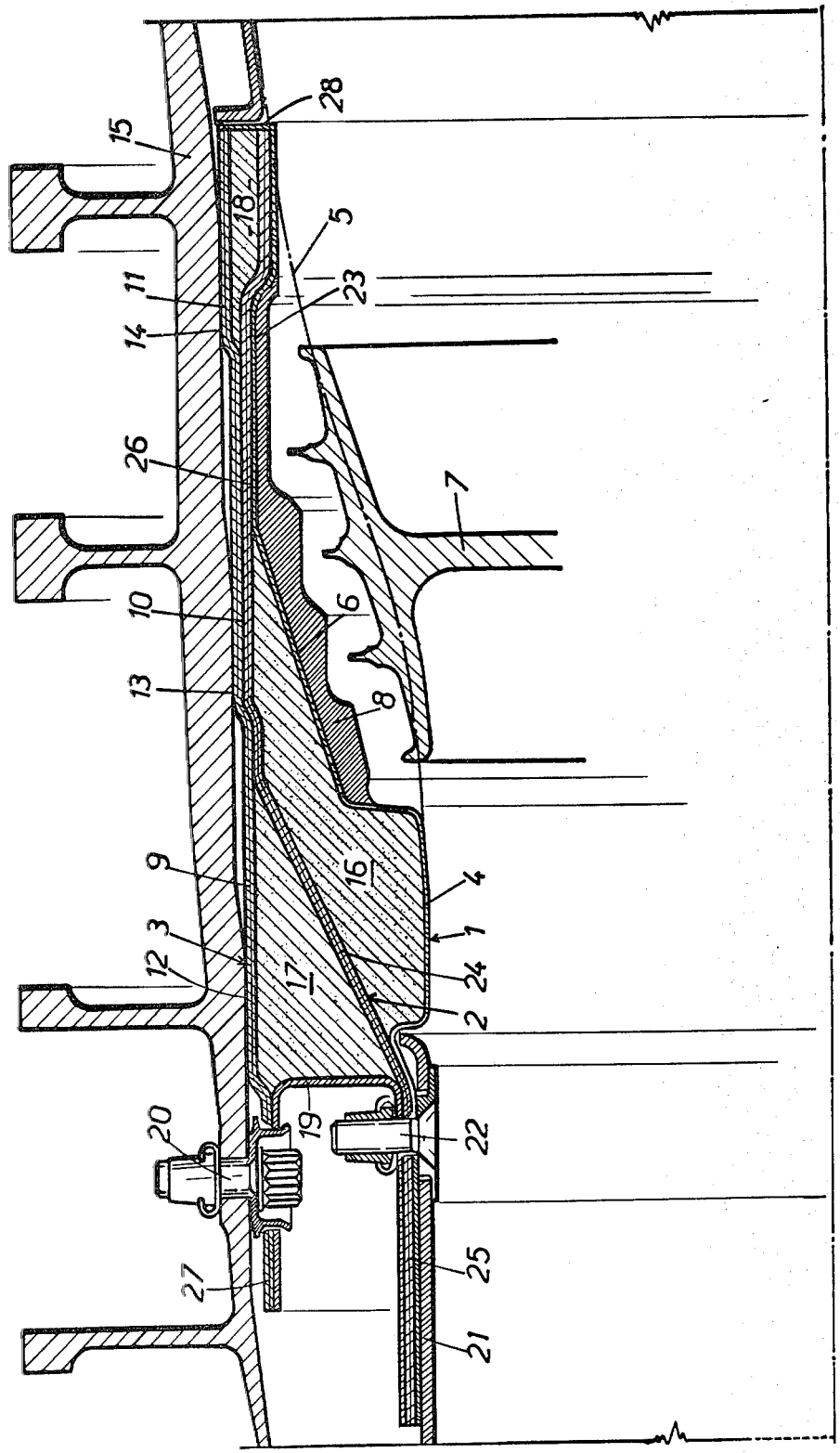

REMOVABLE SUPPORT FOR THE SEALING LINING OF THE CASING OF JET ENGINE BLOWERS

BACKGROUND OF THE INVENTION

This invention is in the field of removable supports for the sealing lining of jet engine blowers, with the casing being at least partially lined with acoustic panels.

Casings of the blowers of jet engines are covered, on their internal wall, with a sealing lining of resins or honeycomb structures capable of being worn down by the blades of the blower without damage to the latter. It is the function of the lining to insure the tightest possible seal between the ends of the blower blades and the casing surrounding them. It is readily understandable that the rubbing of the blades during operation, as the result of both thermal and mechanical deformation, lead to wear, to the extent that the sealing effect of the lining is reduced. It is then necessary to replace the lining, which is a more or less complex operation, depending on the support of the lining. When this support consists of the wall of the casing itself, it is necessary to completely dismantle the casing, sometimes involves the removal of the support for engine accessories, which is always a delicate operation. When the sealing lining is applied to a steel ferrule that is removable by means of bolts from the rest of the casing, radial dimensions are increased in a manner that may be unacceptable. Finally, the sealing lining may be present in the form of bolted segments, which are removable from the inside of the casing. Such an arrangement is shown in French Pat. No. 1,541,216, wherein the sealing lining used is a honeycomb material fastened to supporting plates which consist of a fiber glass reinforcement coated with a thermosetting resin. The internal wall of the blower is covered with plates carrying the sealing lining, secured by means of screws that pass through the corresponding holes of the casing. While facilitating the dismantling and replacement of the sealing lining, such bolted solutions introduce weakend points in the casing and even the dismantling, in the presence of the blower blades themselves, may prove difficult.

SUMMARY OF THE INVENTION

It is the object of the present invention to provide a removable support for a sealing lining that may be repaired in place on the engine, or which is capable of being removed in a single piece without requiring the prior dismantling of the casing, while resulting in a substantial gain in weight.

According to the invention, the removable support for the sealing lining for the casing of jet engine blowers, with the casing being at least partially clad with acoustic panels, consists of at least two concentric ferrules: an inner ferrule having a configuration, along a portion of its length, adapted to conform to the flow of the air stream, and the other part, which corresponds approximately to the zone covered by the blades of the rotor, carrying the sealing lining. An outer ferrule has, at its external face, a plurality of cylindrical portions capable of cooperation, by means of frictional fitting, with surfaces provided on the internal surface of the casing, with the space between the two ferrules being filled with a filler material. At least one ferrule with a U-shaped cross section connects the said first two concentric ferrules with each other, at their ends, the integral part of the outer ferrule receiving fastening means for support on the wall of the casing, and the integral part of the inner ferrule receiving the fastening means for the acoustical panels.

At least one of the ferrules consists of a fiber reinforced synthetic resin.

BRIEF DESCRIPTION OF THE DRAWING

The explanations and the FIGURE presented hereinafter will facilitate an understanding of the embodiment of the invention.

The single FIGURE of the drawing is an axial semi-section of a support according to the invention shown being mounted in a casing.

DESCRIPTION OF A PREFERRED EMBODIMENT

The support for the sealing lining comprises three ferrules 1, 2, 3, concentric to each other. An inner ferrule 1, with a part 4 of its internal surface has a configuration conforming to the flow of the air stream represented by the broken line 5. A further part 6 of the internal surface, approximately corresponding to the zone covered by the blades 7 of the blower rotor, carries the sealing lining 8.

The intermediate ferrule 2 supports, on part of its surface, the inner ferrule 1.

The outer ferrule 3 has on its external surface a plurality of cylindrical portions 9, 10, 11, which cooperated with the surfaces 12, 13, 14, provided on the internal surface of the casing 15. These surfaces function to maintain the structure secured against the wall of the casing; the diameters of the cylindrical surfaces of the support being slightly larger than those of the cylindrical surfaces of the casing. In practice, prior to insertion, the difference between the diameters amounts to 1 to 2%.

The spaces 16, 17 and 18 between the walls of the ferrules, are filled with a filler material.

A ferrule 19 of U-shaped cross section, connects the downstream ends of the outer ferrule 3 with those of the intermediate ferrule 2 and the inner ferrule 1, the latter two being joined together over part of their upstream surfaces and their end being connected at this point with the end of the outer ferrule 3 by means of a flange 28 on the inner ferrule 1. The ferrule 19 has several functions: to enhance the mechanical strength of the support. To permit the fastening of the support to the casing by means of the bolts 20, in order to prevent its rotation, and to make possible the attachment of accoustical panels 21 by the means 22, with these panels extending the aerodynamic profile shown by the line 5.

An equivalent structure is obtained by retaining only two concentric ferrules: the inner ferrule 1, the outer ferrule 3 and the U-shaped ferrule 19, to insure the rigidity of the support.

According to the preferred embodiment represented by the FIGURE, the ferrules 1, 2 and 3 are made of an epoxy resin reinforced with glass fibers and are formed in a known manner, either by winding or by the covering a hollow mold with sheets and impregnation with the resin.

The spaces 16, 17 and 18 between the ferrules are filled with a honeycomb material or with air. The ferrules are adhesively bonded to each other at their abutting surfaces.

The three ferrules may have different thicknesses, as shown in the FIGURE, the outer and intermediate ferrules have thicknesses sufficient to withstand mechanical stresses, while the inner ferrule, which supports only the sealing lining, has a relatively small thickness.

In the embodiment, not shown, comprising only two ferrules, it is advantageous to provide the inner ferrule with a thickness sufficient to withstand a portion of the mechanical stress. The structure with three ferrules assigns the following functions to each of them: support of the sealing lining, support of the acoustical panels, connection with the casing.

The profiles of the different ferrules is chosen so as to avoid problems due to the failure of a blade or due to deformations. Thus, in case of an impact, the blade concerned will sweep a toric volume—hence the configuration given to the intermediate ferrule 2, within a cylinder that must remain beyond the dangerous volume. Similarly, the presence of holes in the retaining zone of the blower casing has been avoided and the structure designed so that it will not interfere with the kinematics of the ejection of debris in case of the loss of a blade.

The advantage of a thin inner ferrule 1, under reduced mechanical stress, is that it permits, in the case of the deterioration of the sealing lining, easy in situ repairs and the replacement of the lining. When the inner ferrule is thick and contributes to the mechanical strength of the structure, such deterioration requires the removal of the support.

The preferred support thus comprises three concentric ferrules: one inner ferrule having, in the direction of the flow of the air stream, at least one first cylindrical part 23, with its end 28 bent outwardly, and a second conical part 6 to which the sealing lining 8 is attached, a third essentially cylindrical part 4 following the aerodynamical profile of air flow; an intermediate ferrule 2 having, in the direction of the flow of the air stream, a first cylindrical part 26 extending approximately over the first cylindrical part 23 and the second conical part 6 of the inner ferrule 1, a second conical part 24 covering approximately the third cylindrical part 4 of the inner ferrule 1, a third cylindrical part 25 extending over the third cylindrical part 4 of the inner ferrule 1; an outer ferrule 3 having, in the direction of the flow of the air stream, four cylindrical parts 11, 10, 9, 27 of decreasing diameter, with at least one of the first cylindrical parts 10 being joined to the cylindrical part 26 of the intermediate ferrule 2; and a ferrule 19 in the shape of a U, secured between the third cylindrical part 25 of the intermediate ferrule 2 and the fourth cylindrical part 27 of the outer ferrule 3.

The support for the sealing lining is used in the following manner: the support is placed to face the casing in the direction of the flow of the air stream, and is forced into said casing, either by means of a mallet, or by special means (screw press, hydraulic press, etc.). This operation is facilitated by the glass fiber reinforced epoxy structure which has a certain degree of elasticity. The three surfaces 9, 10, 11 of the support simultaneously slide into the corresponding surfaces 12, 13, 14 of the casing.

The immobilization in rotation of the support is insured by means of the bolts 20, prior to the installation of the accoustical panels 21.

In the case of deterioration that does not cut into the layers of the inner ferrule 1, the sealing lining is repaired by "spreading" material, which in this case is a synthetic resin onto the lining and then to remachine the side.

In case of more severe deterioration, the support is dismantled in one piece, without the large scale removal of accessories (tubing, etc.) and without dismantling the casing. After removing the acoustical panels 21 and the bolts 20, thrust is applied with the aid of an extractor on the radial face of the rear ferrule 19. The support is then repaired or replaced and reinstalled as indicated hereinabove.

A support for a sealing lining such as that described in the invention is a great advantage with respect to the simplification of maintenance, but another advantage consists of the fact that it is made of light materials (glass fibers, resins) which lead to an important savings in weight.

Finally, the nature of the material itself and the effect of the force fitting result in an attenuating effect which may prevent destructive interactions between the blades and the casing, leading to vibratory excitation of the latter.

It is obvious that the preceding advantages will be of a lesser degree if the ferrules removed from the sealing lining are made of a light metallic material other than resin.

I claim:

1. In a removable support for sealing linings in the blower casings of jet engines, the casing being at least partially attached to acoustic panels, the improvement comprising: at least two concentric ferrules; an inner ferrule having a part of its internal surface conforming to the flow of the air stream and the other part extending over a zone covered by blades of a rotor, said inner ferrule supporting a lining, an outer ferrule being provided on its external surface with cylindrical surfaces adapted to engage surfaces provided on the internal surface of the casing by means of force fitting, the space between the two ferrules being filled with a filler material, and at least one ferrule of U-shaped cross section, connecting the two concentric ferrules at their ends, with the integral part of the outer ferrule receiving securing means, which immobilize said support against rotation relative to the casing.

2. A removable support as defined in claim 1, wherein said support comprises three concentric ferrules, an inner ferrule of small thickness, an intermediate ferrule supporting said inner ferrule on at least part of its internal surface, an outer ferrule and a U-shaped ferrule connecting the three concentric ferrules by their ends, the other ends of the inner ferrule and the intermediate ferrule being in abutment.

3. A removable support as defined in claim 2, wherein said inner ferrule has, in the direction of the flow of the air stream, at least one first cylindrical part comprising a bent end and a second conical part to which a sealing lining is attached, and a third essentially cylindrical part conforming to the aerodynamical flow profile, the intermediate ferrule having, in the direction of the flow of the air stream, a first cylindrical part extending approximately over the first cylindrical part and the second conical part of the inner ferrule, a second conical part covering approximately the third cylindrical part of the inner ferrule, a third cylindrical part approximately coextensive with the third cylindrical part of the inner ferrule, the outer ferrule having, in the direction of the flow of the air stream, four cylindrical parts of decreasing diameter, at least one of the first cylindrical parts being joined with the first cylindrical part of the intermediate ferrule, and the U-shaped ferrule being secured between the third cylindrical part of the intermediate ferrule and the fourth cylindrical part of the outer ferrule, the ends of the first cylindrical parts of the outer ferrule and of the intermediate ferrule being joined together by the bent end of the inner ferrule.

4. A removable support as defined in any one of claims 1 to 3, wherein the concentric ferrules are joined together over at least part of their surface by adhesive bonding.

5. A removable support as defined in any one of claims 1 to 3, wherein the U-shaped ferrule comprises, on its part joined with the intermediate ferrule, means for the attachment of acoustical panels.

6. A removable support as defined in claim 1 wherein at least the inner ferrule is made of a fiber reinforced synthetic resin.

7. A removable support as defined in claim 1 wherein the ferrules are made of epoxy resin reinforced with glass fibers.

* * * * *